United States Patent [19]

Blatt

[11] Patent Number: 5,152,568
[45] Date of Patent: Oct. 6, 1992

[54] EXTENDIBLE GRIPPER

[76] Inventor: John A. Blatt, 22 Stratton Pl., Grosse Point Shores, Mich. 48236

[21] Appl. No.: 645,141

[22] Filed: Jan. 24, 1991

[51] Int. Cl.⁵ ............................................. B25J 15/08
[52] U.S. Cl. ..................................... 294/88; 294/115; 269/34
[58] Field of Search ..................... 294/88, 115; 269/27, 269/30, 32, 34; 414/753

[56] References Cited

U.S. PATENT DOCUMENTS

| | | | |
|---|---|---|---|
| 3,013,835 | 12/1961 | Blatt | 294/88 |
| 3,108,794 | 10/1963 | Blatt | 269/233 |
| 3,371,953 | 3/1968 | Blatt | 294/88 |
| 3,482,831 | 12/1969 | Blatt | 269/32 |
| 3,567,208 | 3/1971 | Blatt | 269/32 |
| 3,635,514 | 1/1972 | Blatt | 294/106 |
| 3,714,870 | 2/1973 | Blatt | 92/140 |
| 3,734,303 | 5/1973 | Blatt | 214/1 BB |
| 4,304,433 | 12/1981 | Langowski | 294/88 X |
| 4,449,745 | 5/1984 | Blatt | 294/88 |
| 4,473,249 | 9/1984 | Valentine et al. | 414/753 X |
| 4,529,182 | 7/1985 | Valentine | 414/753 X |
| 4,728,137 | 3/1988 | Hamed et al. | 294/88 |
| 4,744,596 | 5/1988 | Hiller et al. | 294/88 |
| 5,072,652 | 12/1991 | Blatt | 294/88 X |

Primary Examiner—Margaret A. Focarino
Assistant Examiner—Joseph D. Pape
Attorney, Agent, or Firm—BAsile and Hanlon

[57] ABSTRACT

A fluid pressure actuated gripper including a fluid pressure actuated motor including a cylinder and a piston with the piston being fixedly mounted by a purality of support rods upon a fixed base. The support rods are slidably and sealingly received in the rear end wall of the cylinder and passages through the support rods are employed to conduct fluid under pressure to and from the opposite ends of the piston chamber. A piston rod projecting from the front end of the cylinder is pivotally coupled to linkage operatively connected to gripper jaws pivoted on extensions of the cylinder. In operation, the piston remains stationary and movement of the cylinder relative to the piston is employed to open and close the jaws. The jaws are carried upon pivots which move horizontally with the cylinder, hence horizontal displacement of the jaws relative a fixed reference point is substantially increased as compared to grippers in which the jaw pivots are stationary during operation.

5 Claims, 3 Drawing Sheets

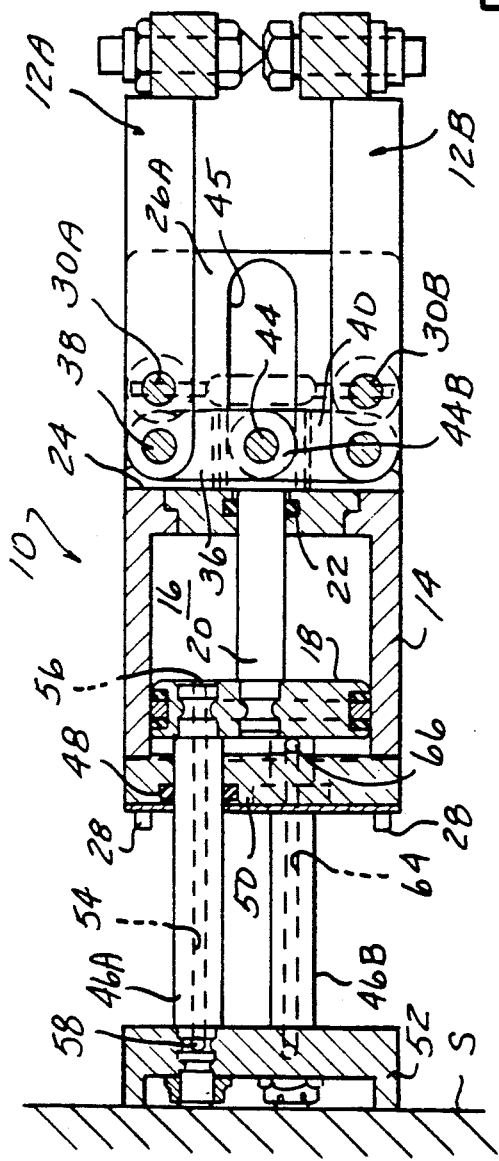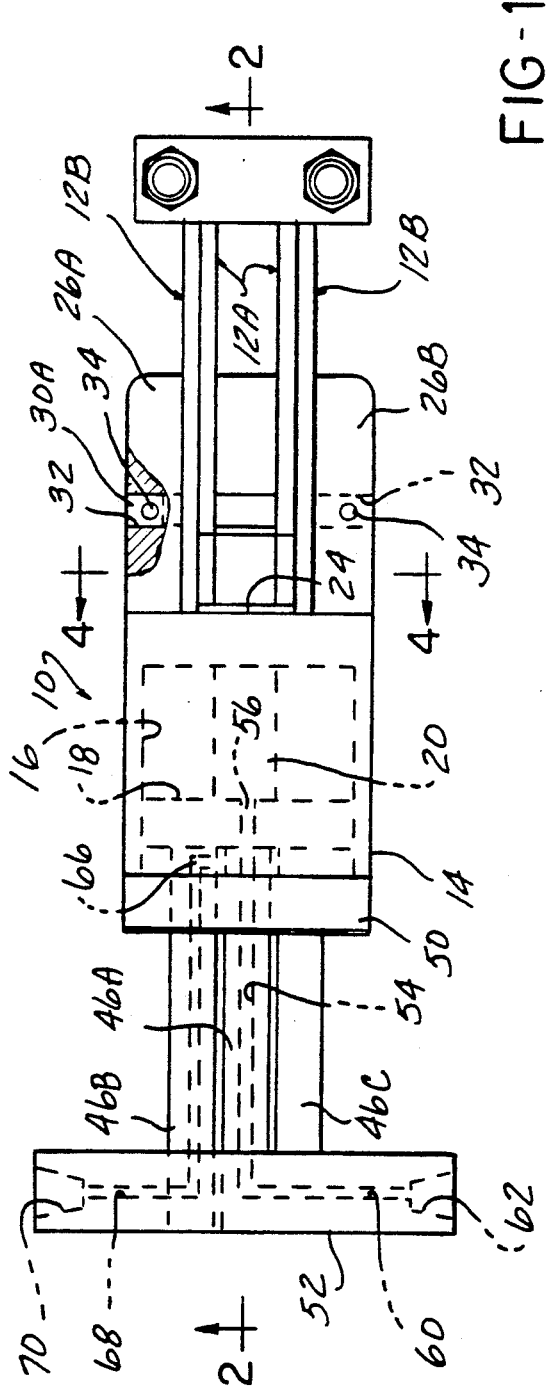

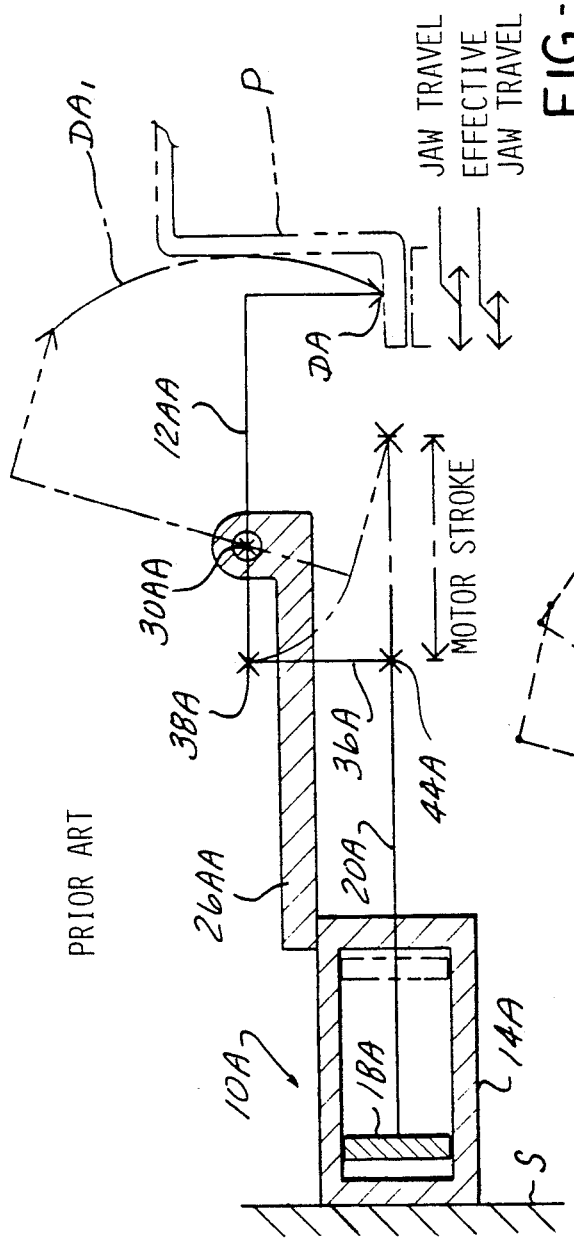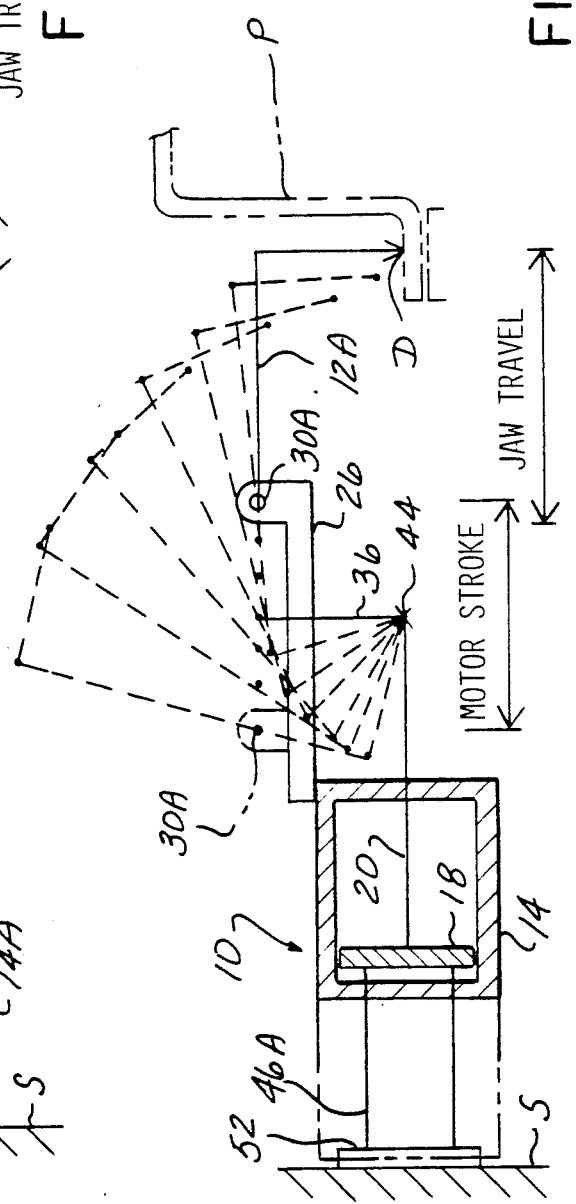

EXTENDIBLE GRIPPER

BACKGROUND OF THE INVENTION

The present invention relates to a fluid pressure actuated gripper of the type employed in automated workpiece handing devices to clampingly grip and transfer a workpiece from one work station to another at which the workpiece is released from the gripper while a work operation is performed on the workpiece.

Grippers of this type are widely employed and typically take the form of a pneumatic or hydraulic differential pressure motor whose cylinder is fixedly mounted upon the transfer device. At the forward or rod end of the cylinder housing, a gripper jaw mounting structure is fixedly mounted on the cylinder to pivotally support a pair of opposed gripper jaws which are coupled to the piston rod of the motor by a linkage so arranged that upon stroking of the piston rod in one direction the jaws are pivoted to an open position and driven to a closed workpiece gripping position upon stroking of the piston rod in the opposite direction.

In a typical application, the gripper jaws will be closed upon a workpiece near an edge of the workpiece and the gripper will be advanced to position the gripped workpiece in operative relationship with tooling at a work station. The gripper jaws will then be opened to release the workpiece and the transfer device will retract the gripper from the work station while the work operation is performed. At the conclusion of the work operation, the gripper will then be advanced back into the work station and the jaws again closed upon the part to carry the part away from the work station. Opening and closing of the gripper jaws thus takes place when the gripper is in its closest proximity to tooling at the work station. In grippers of the type described above, the gripper jaws pivot about a pivot axis which is stationary during the opening and closing movement, and the path of movement of the jaws between their open and closed position is thus along a circular arc assuming the pivot axis to be horizontal, of constant radius centered at the jaw pivot. Desirably, vertical movement of the jaws between their clamping and release position should be minimized in that vertical separation of the jaws to a position where they are separated from the part is all that is required to release the part, and if this vertical movement is kept at a minimum, problems of vertical clearance will also be minimized. On the other hand, horizontal movement of the jaws relative to a fixed reference point during opening and closing movement may advantageously be relatively large in that this horizontal movement may withdraw the jaws from beneath an overhanging portion of the tooling. Where the jaw is mounted only for movement about a fixed pivot, the horizontal and vertical components of movement of the operative portions of the jaw are established in a fixed and inflexible relationship to each other.

The present invention is especially concerned with the provision of a fluid pressure actuated gripper in which the horizontal component of movement of the gripper jaw during movement between its open and closed positions can be extended or enlarged.

SUMMARY OF THE INVENTION

In accordance with the present invention, a gripper assembly includes a fluid pressure actuated motor having a pair of gripper jaws mounted for pivotal movement on a forwardly projecting extension of the cylinder, with the jaws being operatively connected via a linkage to the piston rod to be shifted in opening and closing movement in response to movement of the piston rod relative to the cylinder. The mechanical arrangement of these last components relative to one another and their physical dimensions may be the same as employed in conventional grippers in which the cylinder or housing of the fluid pressure actuated motor is fixedly mounted upon a support surface.

In accordance with the present invention, however, the piston and piston rod of the fluid pressure actuated motor are fixedly mounted to the support surface, and fluid pressure induced actuation of the motor causes the cylinder to move relative to the fixed piston and fixed support surface to which the piston is attached.

The gripper of the present invention finds the piston rod of the fluid motor projecting from the piston through the front end wall of the housing. A plurality of rigid mounting rods are fixedly secured to the piston and project rearwardly from the piston through the rear end wall of the cylinder or motor housing and are fixedly secured at their rearward ends to a mounting plate or base employed to fixedly mount the assembly upon a support surface. One of the support rods is provided with a flow passage opening through the piston into that portion of the piston chamber between the piston and front end wall, while another support rod is formed with an internal passage which opens into that portion of the piston chamber between the piston and rear end wall of the housing. These passages are connected via passages in the mounting plate to external conduits for supplying fluid under pressure to or from the respective piston chambers in a well known manner.

The gripper jaws are pivotally mounted on an extension of the cylinder or motor housing and coupled to the piston rod by a link pivotally connected at one end to the jaw and at its opposite end to the piston rod. When the motor is actuated by differential pressure, as stated above the piston rod remains fixed, while the cylinder housing, and thus the pivot upon which the gripper jaws are mounted moves horizontally-i.e. parallel to the direction in which the motor strokes. Thus, in this arrangement, the distal end of the gripper jaw during movement between its open and closed position has a horizontal component of movement which includes not only the horizontal component of its pivotal movement about its pivot, but also an additional horizontal component of movement represented by horizontal movement of its pivot.

Other objects and features of the invention will become apparent by reference to the following specification and to the drawings.

IN THE DRAWINGS

FIG. 1 is a top plan view, with certain parts broken away or shown in section, of a gripper embodying the present invention;

FIG. 2 is a cross-sectional view of the gripper of FIG. 1 taken approximately on line 2—2 of FIG. 1;

FIG. 5 is a schematic diagram of a gripper of more or less conventional construction showing movement of one gripper jaw; and FIG. 6 is a schematic diagram showing movement of a gripper jaw of a gripper embodying the present invention.

Figure 3:
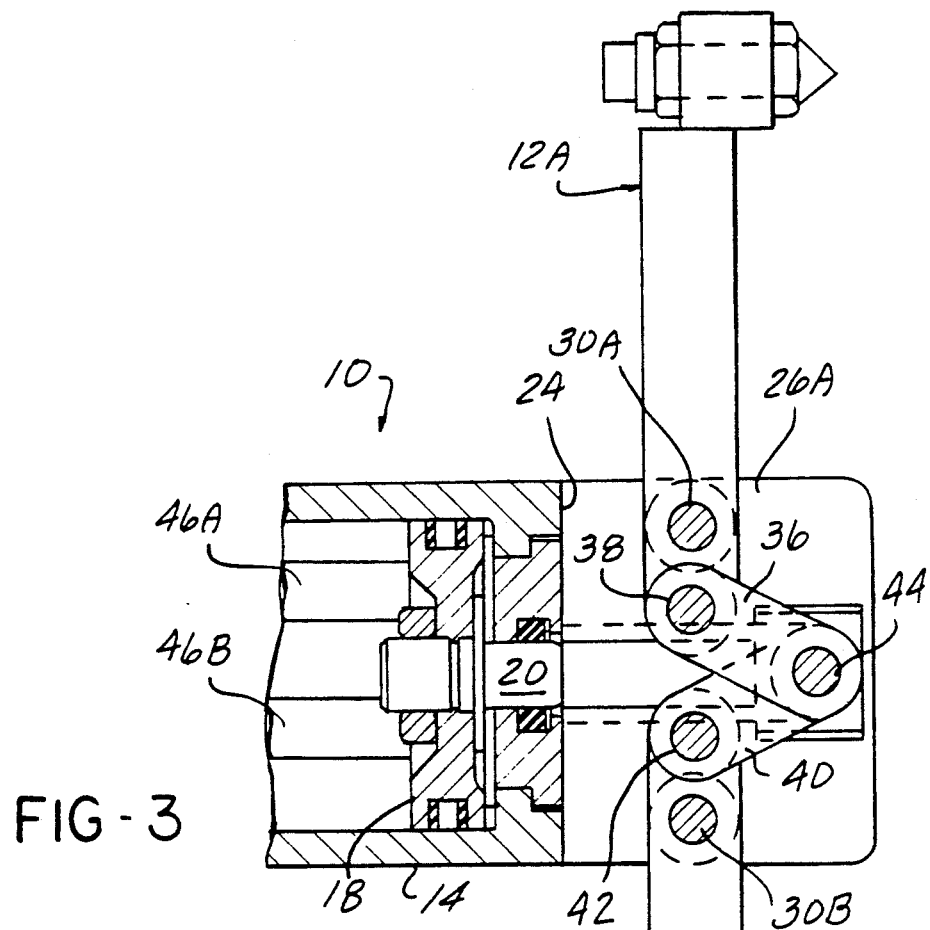
FIG. 3 is an enlarged partial cross-sectional view showing a portion of the mechanism with the gripper jaws in their fully open position.
Figure 4:
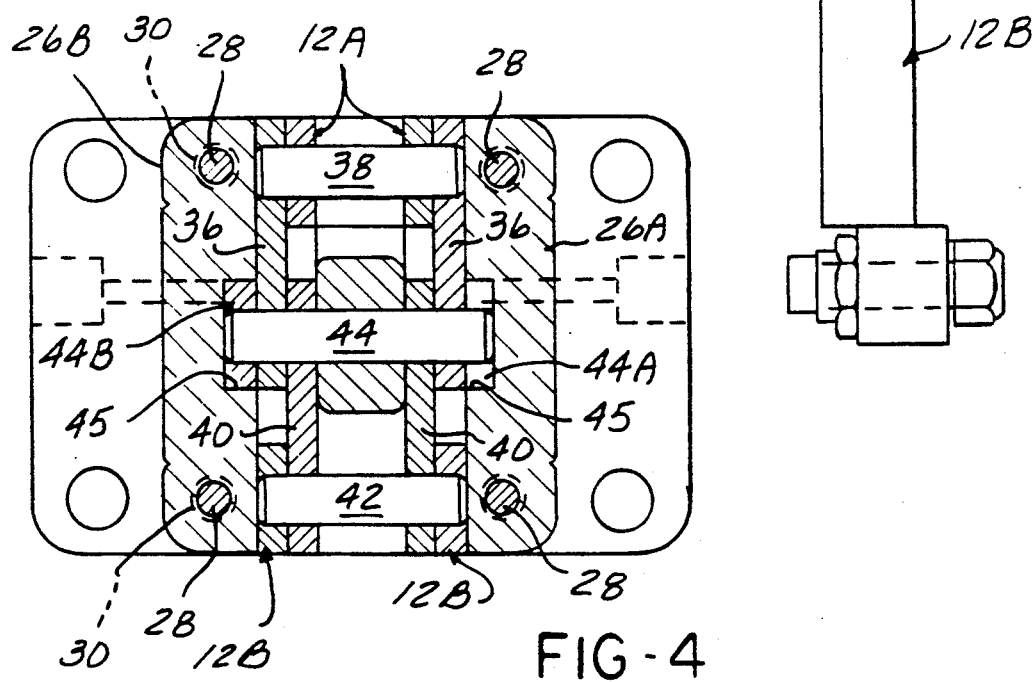
FIG. 4 is a detailed cross-sectional view taken on line 4—4 of FIG. 1.

Referring first particularly to FIGS. 1 and 2, a gripper embodying the present invention includes a fluid pressure actuated motor designated generally 10 which is employed to actuate a pair of opposed gripping jaws designated generally 12A and 12B between a closed position shown in FIGS. 1 and 2 and a fully opened position shown in FIG. 3. Motor 10 is made up of a motor housing or cylinder 14 having an internal piston receiving chamber 16 within which a piston 18 is slidably and sealingly received for movement relative to the cylinder between the positions indicated in FIGS. 2 and 3. A piston rod 20 is fixed at its rear end to piston 18 and projects forwardly from the piston through a sliding seal 22 in the front end wall 24 of the cylinder in a well known manner. A pair of side plates 26A and 26B are fixedly mounted upon the front end wall of cylinder 14 to project forwardly from cylinder 14 in spaced opposed parallel relationship to each other as best seen in FIGS. 1 and 4. Side plates 26A and 26B may be integrally formed with cylinder 14 or may be detachably mounted on cylinder 14 by means of bolts 28 (FIGS. 2 and 4) which extend forwardly through bores through the wall of cylinder 14 into tapped bores 30 (FIG. 4) in the rearward ends of side plates 26A and 26B. In the particular motor illustrated, the motor housing or cylinder 14 is of a substantially square transverse cross-section, while piston chamber 16 is in the form of a cylindrical bore, this configuration affording adequate wall thickness to accommodate the bolt receiving bores through the cylinder wall.

Gripper jaws 12A and 12B are pivotally mounted upon and between side plates 26A and 26B by pivot pins 30A and 30B whose opposite ends are received in bores such as 32 through side plates 26A, 26B and retained in the side plates as by pins 34 (FIG. 1). A pair of upper links 36 are pivotally connected to the jaw 12A as by a pivot pin 38, and a pair of lower links 40 are pivotally connected at one end to jaw 12B as by a pivot pin 42. The opposite ends of links 36 and 40 are commonly connected to the front end of piston rod 20 as by a pivot pin 44. Pin 44 carries at its opposite ends rollers 44A, 44B which ride in horizontally elongate slots 45A, 45B (FIGS. 2 and 4) in side plates 26A, 26B to stabilize the linkage during movement.

A plurality of rigid mounting rods 46A, 46B, 46C, are fixedly secured at their forward ends to piston 1 and project rearwardly from the piston through sliding seals such as 48 (FIG. 2) in rear end wall 50 of cylinder 14 in parallel relationship to the longitudinal axis of piston rod 20. The rearward ends of mounting rods 46A, 46B, and 46C are fixedly mounted in a mounting plate which is adapted to be bolted or otherwise fixedly secured to a support surface S (FIG. 2).

Support rod 46A is formed with an internal passage 54 which opens through the forward end of rod 46A into that portion of chamber 16 between the front face of piston 18 and front end wall 24 of the cylinder. Near the rearward end of support rod 46A a transverse passage 58 places passage 54 in communication with a passage 60 which extends through mounting plate 52 to port 62 at one side of mounting plate 52. Passages 60 and 54 are employed to conduct fluid under pressure to or from that portion of piston chamber 16 at the front side of piston 18.

Support rod 46B is formed with a central fluid passage 64 which opens at its forward end (FIG. 1) as at 66 into that portion of chamber 16 to the rear of piston 18. The opposite or rearward end of passage 64 communicates with a passage 68 in mounting plate 52 which communicates with a port 70 to enable fluid under pressure to be supplied to or withdrawn from that portion of piston chamber 16 to the rear of piston 18.

Ports 62 and 70 are intended to be connected in a conventional manner to the control ports of a four-way reversing valve whose supply and return ports are connected respectively to a source of fluid under pressure and to the return or low pressure side of the pressure supply system. Operation of such valves to apply pressure to one side of the piston of a fluid motor while venting the opposite side is conventional and well known.

In FIG. 2 the gripper is shown with its jaws 12A and 12B in a fully closed position and piston 18 at its rearward end limit of movement relative to cylinder 14. This is the situation which exists when fluid under pressure is supplied to that portion of chamber 16 at the front side of piston 18 while that portion of chamber 16 to the rear of piston 18 is being vented. In that piston 18 is fixed to what will be assumed to be a fixed support surface S, it would perhaps be more accurate to state that in FIG. 2 cylinder 14 is shown at its forward end limit of movement relative to piston 18 in that in terms of a fixed reference point the cylinder 14 moves while the piston remains stationary. Upon reversal of the fluid pressure connections to motor 10, cylinder 14 is driven rearwardly to the position relative to piston 18 shown in FIG. 3, and this motion of the cylinder and its attached side plates 26A, 26B relative to the fixed pivot 44 at the forward end of the stationary piston rod 20 actuates the linkage 36, 40 to swing the gripper jaws 12A, 12B from the closed position shown in FIG. 2 to the fully opened position shown in FIG. 3.

By moving the cylinder of the fluid pressure motor relative to a fixed reference point instead of the conventional practice of establishing the cylinder as a fixed reference point and driving the piston in movement, advantages best seen from a comparison of the schematic diagrams of FIGS. 5 and 6 are achieved.

In the schematic diagram of FIG. 5 a conventional gripper assembly is schematically illustrated with those parts of the device analogous to parts of the present invention identified by corresponding reference numerals followed by the suffix A. In the conventional FIG. 5 arrangement, the cylinder 14A of a fluid pressure actuated motor 10A is fixedly mounted upon a fixed support surface S. The piston 18A has its piston rod 20A connected by a pivot 44A to one end of a link 36A whose opposite end is pivotally connected by a pivot 38A to a gripper jaw 12AA. Jaw 12AA is mounted, as by a pivot 30AA mounted in turn upon an extension or side plate 26AA fixedly secured to the cylinder 14A of the motor. As compared to the gripper described in detail above, only one of a pair of jaws is shown, the action on the other pair being identical.

In the conventional arrangement shown in FIG. 5, the jaw 12AA is shown in full line in its fully closed position at which the distal end DA of the jaw is engaged with one side of a workpiece partially indicated in broken line at P.

Upon application of fluid pressure to motor 10A to cause the piston 18A of FIG. 5 to drive to the right, piston rod 20A will move horizontally to the right as viewed in FIG. 5 until the link and jaw assume the broken line position shown in FIG. 5. At this time the jaw 12AA will be in an open position and the distal end DA of the jaw in moving from the full line closed to the broken line opened position will follow the path $DA_1$ which is a circular arc of constant radius centered at the axis of pivot 30AA.

In FIG. 5, a double-ended arrow identified as MOTOR STROKE indicates the length of stroke of the piston, while a second double-ended arrow identified as JAW TRAVEL indicates the overall horizontal component of movement of the distal end DA of the jaw during movement of the jaw between its fully opened and fully closed positions. Note that because the distal end DA is below the fixed pivot 30AA when in the closed position and above the pivot when in the fully opened position, the arcuate path $DA_1$ shows that during movement from the closed position to the open position the distal end DA first moves to the right as viewed in FIG. 5 until it is elevated into horizontal alignment with pivot 30AA and then begins to move to the left over the remainder of its opening movement. This results in a total horizontal component of movement represented by the double arrow identified in FIG. 5 as JAW TRAVEL. However, insofar as effective horizontal retraction of the jaw in a direction away from the part P (or tooling, not shown) is concerned only a substantially smaller horizontal component of movement represented by the double-ended arrow identified as EFFECTIVE JAW TRAVEL is accomplished and, given the dimensional proportions of the mechanism shown in FIG. 5, this EFFECTIVE JAW TRAVEL is but a small proportion of the total MOTOR STROKE. Where the workpiece or part P may have a configuration such as that indicated in FIG. 5, it is apparent that clearance problems with stationary or moving parts of tooling which must operate on the part P may well arise.

In FIG. 6 a comparable schematic diagram of a gripper embodying the present invention is shown, with the various parts of the mechanism being of the same physical dimensions and configuration as the corresponding parts of the diagram of FIG. 5. The reference numerals employed in FIG. 6 correspond to the reference numerals employed in the detailed description of the present invention set forth above, only one jaw 12A being indicated in FIG. 6.

Because the motion of the various parts of the mechanism schematically indicated in FIG. 6 is somewhat more complex, opening movement of the jaw 12A from the full line closed position indicated in FIG. 6 is indicated in several stages. Opening movement of the device schematically illustrated in FIG. 6 is caused by supplying fluid under pressure to motor 10 to cause cylinder 14 to move to the left from its full line position in FIG. 6. Motion of the jaw 12A and link 36 is indicated in the successive broken line positions.

In FIG. 6, the length of the motor stroke is indicated by the double-ended arrow identified as MOTOR STROKE, and this is located in FIG. 6 to indicate the horizontal displacement of jaw pivot 30A. The horizontal component of movement of the distal end D of jaw 12A is indicated by the double-ended arrow JAW TRAVEL. The length of the MOTOR STROKE of the mechanism schematically illustrated in FIG. 6 is the same as the length of the MOTOR STROKE of the mechanism schematically diagramed in FIG. 5. It is believed apparent that the mechanism diagramed in FIG. 6, which corresponds to the gripper of the present invention, achieves a substantially greater horizontal component of jaw extension than is achieved by mechanisms of the conventional type as diagramed in FIG. 5. Further, it will be noted that all of the jaw travel during opening of the jaws is away from the part P and the path followed by the distal end D of the jaw of the FIG. 6 mechanism follows a curve of a reversed S configuration which would afford obvious advantages in the case of a part configuration as illustrated in FIGS. 5 and 6 or the case where tooling at the work station overhung the jaw when the jaw was in its closed position.

While one embodiment of the invention has been described, it will be apparent to those skilled in the art the disclosed embodiment may be modified. Therefore, the foregoing description is to be considered exemplary rather than limiting, and the true scope of the invention is that defined in the following claims.

I claim:

1. A fluid pressure actuated clamping device comprising a fluid pressure actuated motor, said motor including a motor housing having front and rear end walls and a piston chamber extending along a first axis within said housing between said front and rear end walls, a piston slidably and sealingly received within said chamber for fluid pressure actuated movement relative to said housing along said first axis, first rod means fixedly secured at one end to said piston and extending rearwardly from said piston parallel to said first axis through said rear end wall of said housing to an opposite end located externally of said housing, second rod means fixedly secured at one end to said piston and extending forwardly from said piston parallel to said first axis through said front end wall to an opposite end located externally of said housing, said first and second rod means being slidably and sealingly received respectively in said rear and front end walls, clamping jaw means pivotally mounted upon said housing adjacent said front end wall, link means coupling said jaw means to said opposite end of said second rod means for pivoting said jaw means between a jaw open and a jaw closed position in response relative movement between said piston and said housing, and mounting means fixedly secured to said opposite end of said first rod means for fixedly mounting said first rod means upon a support surface.

2. The invention defined in claim 1 wherein said first rod means comprises a plurality of elongate rigid rod members having rod axes parallel to and symmetrically spaced about said first axis, and said mounting means comprises a rigid base member fixedly secured to said rod members.

3. The invention defined in claim 2 wherein said base member and one of said plurality of rod members and said piston have means therein defining a passage for conducting fluid under pressure to or from that portion of said piston chamber between said piston and said front end wall, and said base member and another of said plurality of rod members have means therein defining a passage for conducting fluid under pressure to or from that portion of said piston chamber between said piston and said rear end wall.

4. The invention defined in claim 1 wherein said motor housing includes a pair of spaced opposed parallel side walls extending forwardly from said front end walls, each of said side walls having an elongate slot therethrough extending parallel to said first axis, pivot pin means pivotally coupling said link means to the forward end of said second rod means, said pivot pin means including guide means received in said slots for guiding the forward end of said second rod means in movement relative to said housing.

5. The invention defined in claim 4 wherein said guide means comprises a pair of rollers respectively rotatively mounted on the opposite ends of said pivot pin means for rolling movement along said slots in said side walls.

* * * * *